United States Patent Office 2,817,660
Patented Dec. 24, 1957

2,817,660

DISAZO DYESTUFFS

Otto Schmid, Muttenz, and Meinrad Hurbin, Basel, Switzerland, assignors to J. R. Geigy A.-G., Basel, Switzerland No Drawing. Application March 1, 1956
Serial No. 568,718

Claims priority, application Switzerland March 23, 1955

9 Claims. (Cl. 260—178)

The invention concerns disazo dyestuffs which are suitable for the dyeing of wool from a neutral to weakly acid bath in shades which are fast to wet and light. It also concerns processes for the production of the new disazo dyestuffs, their use for the fast dyeing of polypeptide material and, as industrial product, the material fast dyed with the aid of these dyestuffs.

It has been found that valuable disazo dyestuffs are obtained if a diacyl derivative derived from an o-aminobenzene sulphonic acid of an organic diamino compound, of an aromatic dihydroxy compound or of an aminohydroxyaryl compound is tetrazotised and coupled with 2 mols of the same or with 1 mol of each of two different 2-aminonaphthalene sulphonic acids which couple in the 1-position.

Preferably the tetrazo components are not sulphonated and the benzene rings of the acyl radicals thereof are not further substituted. The benzene rings may, however, advantageously contain non-ionogenic substituents, for example, halogen, alkyl, alkoxy, phenoxy, acylamino, or alkyl sulphonyl groups.

The tetrazo components can be derived from aliphatic, araliphatic, isocyclic-aromatic, hydrocyclic or heterocyclic diamines. Advantageously the acyl radicals are bound to secondary amino groups. This class of tetrazo components which are usable according to the present invention are produced by reacting o-nitrobenzene sulphonic acid halides, advantageously in the presence of strong tertiary nitrogen bases such as triethylamine, with secondary diamines; more advantageously the o-nitrobenzene sulphonyl derivatives of primary diamino compounds are alkylated at the amide nitrogen atom by methods known per se. Alkyl, hydroxy alkyl, cycloalkyl, aryloxyalkyl or aralkyl chlorides or bromides are used as alkylating agents. It is of advantage to introduce lower alkyl groups with 1 to 4 carbon atoms into aromatic diamides and to introduce aralkyl or phenoxyalkyl groups into aliphatic diamides. Finally, the nitro groups in the acyl radicals are reduced to amino groups. Starting materials for the tetrazo components according to the present invention are aliphatic diamines such as ethylene diamine, 1.4-diaminobutane, 1.6-diaminohexane, bisaminoethyl ether, bisaminoethyl sulphide, bisaminoethyl glycol ether, alicyclic diamines such as 4.4'-diamino-dicyclohexyl methane, araliphatic diamines such as 4-aminobenzylamine, 2- or 4-aminophenoxyethylamine, N.N'-diphenylethylene diamine, aromatic diamines such as 1.3- or 1.4-diaminobenzene, 1.4- or 1.5-diaminonaphthalene, in particular however, the bisaminophenyl compounds having phenyl radicals bound direct or by way of bridging members or, possibly also, heterocyclic diamines such as piperazine. A group of starting materials for the production of tetrazo components usable according to the present invention which is of particular technical interest are the bisaminophenyl compounds such as 4.4'-diaminodiphenyl, 4.4'-diaminodibenzyl, bis-aminophenyl alkanes and cycloalkanes, bis-aminophenylethers, thioethers, sulphoxides, sulphones, ketones, ureas, in particular, benzidine and homologues thereof as well as the bis-aminophenyl alkanes and cycloalkanes and homologues thereof substituted in the ring are technically valuable starting materials.

The tetrazo components can also be derived from aromatic dihydroxy compounds which are esterified by the usual methods with o-nitrobenzene sulphonic acid halides, after which the nitro groups are reduced to amino groups. For example 1.3- or 1.4-dihydroxybenzene, 1.5-, 2.6- and 2.7-dihydroxynaphthalene can be used as starting materials. Of greater technical interest here are also the bis-hydroxyphenyl compounds, for example the bis-hydroxyphenyl ethers, thioethers, sulphoxides and sulphones, in particular however, the bis-hydroxyphenyl alkanes and cycloalkanes which can easily be produced from aliphatic and cycloaliphatic carbonyl compounds, in particular the ketones and phenols or cresols.

Finally, the tetrazo components can also be derived from amino-hydroxyaryl compounds, for example from 4-hydroxy-1-aminobenzene, from 4-hydroxy-4'-aminodiphenyl, from 2- or 4-amino-3'- or -4'-hydroxydiphenyl ether or from 2- or 4-amino-4'-hydroxydiphenyl sulphide. Advantageously the bis-o-nitrobenzene sulphonyl derivatives of these starting materials are alkylated at the amide nitrogen atom and then the nitro groups are reduced to amino groups.

The unsulphonated bis-o-aminobenzene sulphonyl compounds usable according to the present invention are tetrazotised advantageously either in inert organic solution in the presence of mineral acids with sodium nitrite or in concentrated sulphuric acid with nitrosyl sulphuric acid. Lower alcohols or lower fatty acids can be used as inert organic solvents.

The 2-aminonaphthalene sulphonic acids which couple in the 1-position usable as azo components according to the present invention can contain preferably only one, or possibly also two sulphonic acid groups. They can also be still further substituted, for example at the nitrogen atom of the amino group by alkyl and possibly by benzyl or phenyl groups; at the naphthalene ring by halogen or alkoxy groups and, in suitable positions, also by hydroxyl groups. Particularly valuable disazo dyestuffs according to the present invention are obtained from primary 2-aminonaphthalene monosulphonic acids, e. g. from 2-aminonaphthalene-5-, -6- or -7-sulphonic acid or from 2-amino-8-hydroxynaphthalene-6-sulphonic acid. Further examples of coupling components are: 2-aminonaphthalene-3.6-disulphonic acid, 2-amino-8-hydroxynaphthalene-3.6-disulphonic acid, 2-methylamino- or 2-ethylamino-naphthalene-5-, -6- or -7-sulphonic acid, 2-methylamino- or 2-ethylamino-8-hydroxynaphthalene-6-sulphonic acid, 2-amino-5-methoxy- or -5-ethoxynaphthalene-7-sulphonic acid.

The coupling is performed in the usual way in the cold with the acid solutions of the alkali salts of the coupling components in the presence of agents which buffer the mineral acid such as sodium acetate or sodium formate.

The new disazo dyestuffs correspond to the general formula:

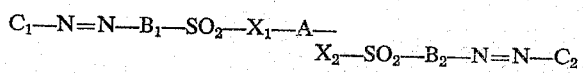

In this formula: $C_1$ and $C_2$ each represent the radical of a 2-aminonaphthalene sulphonic acid coupled in the 1-position, advantageously of a 2-aminonaphthalene monosulphonic acid, $B_1$ and $B_2$ each represent a benzene ring containing the azo linkage in the o-position to the sulphonyl group, advantageously two identical and not further substituted or possibly non-ionogenically substituted benzene rings, $X_1$ and $X_2$ each represent an oxygen atom or a

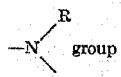
group wherein R represent a lower alkyl radical, an aralkyl radical, a phenoxyalkyl radical or possibly also a phenyl radical or also hydrogen, and A represents the radical of an aliphatic, araliphatic or aromatic diamine, of a diphenol or of an amino-hydroxy-aryl compound and advantageously a 4.4'-diphenyl-, a geminate 4.4'-diphenylalkane or cycloalkane radical.

In the form of their alkali salts, e. g. the lithium, sodium, potassium or ammonium salts, the new disazo dyestuffs are powders which dissolve in water with an orange, red to brown colour. They dye polypeptide fibres and in particular, wool, often even from a neutral or weakly acid bath which is completely exhausted, in pure orange, yellow-red, red or blue-red shades. The wool dyeings are generally distinguished by excellent wet fastness properties and often also by very good fastness to light.

The following examples describe the production of some disazo dyestuffs according to the present invention as well as their use for the dyeing of wool and the table contains further examples obtainable by similar methods, to which, however, the invention is not limited. Where not otherwise stated, in the examples the parts are given as parts by weight and the temperatures are in degrees centigrade. The relationship of parts by weight to parts by volume is as that of kilogrammes to litres.

EXAMPLE 1

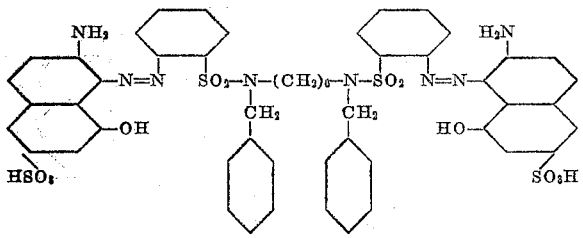

30.3 parts of bis-(o-aminobenzene sulphonyl)-N.N'-dibenzyl 1.6-hexamethylene diamine (M. P. 121°) are dissolved in 50 parts of hot glacial acetic acid. First 5 parts of concentrated sulphuric acid are carefully added to the solution at 20° and then, while cooling externally and stirring well, the solution of 6.9 parts of sodium nitrite in 35 parts of concentrated sulphuric acid is added at 0° to 10°. The whole is stirred for 30 minutes at 0 to 10° and then the solution is diluted by the gradual addition of ice and finally of ice water until the volume is made up to 500 parts. This yellow solution of the tetrazonium compound is poured at 0–10° into a solution of the sodium salt of 24.0 parts of 2-amino-8-hydroxynaphthalene-6-sulphonic acid and 100 parts of sodium acetate in 1000 parts of water whereupon the colour changes to red and the disazo dyestuff formed quickly precipitates as a brown-red powder. The mixture is stirred for another 2 hours at 0–10°, warmed to 70° and neutralised by sprinkling in sodium carbonate. The disazo dyestuff is then filtered off under suction and dried. It is obtained as a dark brown powder which dissolves in hot water with a red colour and it dyes wool from a neutral to weakly acid bath in pure red shades. The wool dyeings have good wet and light fastness properties.

A disazo dyestuff which dyes wool blue-red is obtained if in the above example, 26.7 parts of 2-ethylamino-8-hydroxynaphthalene-6-sulphonic acid are used as coupling component.

EXAMPLE 2

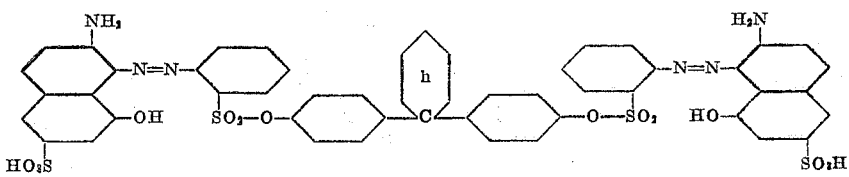

29 parts of 4.4'-bis-(o-aminobenzene sulphonyl-N-ethylamino)-2.2'-dimethyldiphenyl (M. P. 168°) are dissolved in 50 parts of hot glacial acetic acid. The solution is allowed to cool to 20°, and first 5 parts of concentrated sulphuric acid are added while stirring well and with external cooling and then a solution of 6.9 parts of sodium nitrite in 35 parts of sulphuric acid is added at 0–10°. After stirring for one hour, ice is added in portions to the yellow solution and then the volume is brought to 500 parts by dilution with ice water. The yellow solution of the tetrazonium compound is poured at 0 to 5° into a solution of the sodium salt of 26 parts of 2- ethylamino-naphthalene-7-sulphonic acid and 100 parts of crystallised sodium acetate in 1000 parts of water. The disazo dyestuff formed crystallises out very quickly from the red solution in the form of a red powder. The mixture is then stirred for 2 hours at 10–20°, then heated to 70°, neutralised by sprinkling in sodium carbonate and the dyestuff is drawn off under suction and dried. It dissolves in hot water with a yellow-red colour and dyes wool from a neutral to weakly acid bath in the presence of ammonium sulphate in very pure, light fast yellowish-red shades.

Dyestuffs with similar properties are obtained if in the above example 27.5 parts of 4.4'-bis-(o-aminobenzene sulphonyl-N-methylamino)-2.2'-dimethyldiphenyl or 27.5 parts of 4.4'-bis-(o-aminobenzene sulphonyl-N-ethylamino)-diphenyl are used as tetrazo components and otherwise the same procedure is followed.

EXAMPLE 3

57.8 parts of 1.1-bis-[4'-(2''-aminobenzene sulphonyloxy)-phenyl]-cyclohexane (M. P. 153–154°) are suspended in 150 parts of glacial acetic acid and completely dissolved by the dropwise addition while cooling of 30 parts of sulphuric acid. It is tetrazotised by the slow addition at 5–10° of 13.8 parts of sodium nitrite in 35 parts of water. The tetrazo solution is diluted by the gradual addition of 300 parts of ice and then it is poured at 10–12° while stirring into the solution of the sodium salt of 47.8 parts of 2-amino-8-hydroxynaphthalene-6-sulphonic acid in 500 parts of water. The mineral acid reaction of the coupling is buffered until Congo red paper is no longer coloured blue by the dropwise addition of a solution of 60 parts of sodium acetate in 300 parts of water within one hour. The red suspension is stirred for another hour at 10–20°, then heated to 60° and neutralised with sodium carbonate. The sodium salt of the disazo dyestuff which precipitates is then drawn off under suction and dried.

It is a blue-red powder which dissolves in hot water with a bluish-red colour and dyes wool from a neutral to weakly acid bath in pure, bluish-red shades. The wool dyeings have very good washing, milling, sea water and light fastness properties.

Dyestuffs with similar properties are obtained if in the above example 53.8 parts of 2.2-bis-[4'-(2''-aminobenzene sulphonyloxy)-phenyl]-propane or 60.0 parts of 1.1-bis-[4'-(2''-aminobenzene sulphonyloxy)-phenyl]-1-phenylethane or 63.2 parts of 2.2-bis-[4'-(2''-aminobenzene sulphonyloxy)-phenyl]-decaline are used as tetrazo components and otherwise the same procedure is followed.

The tetrazo components are obtained by reacting 2 mols of 2-nitrobenzene sulphonic acid chloride with the condensation products of excess phenol with cyclohexanone, acetophenone or decalone-2 and reduction of the nitro groups to amino groups.

EXAMPLE 4

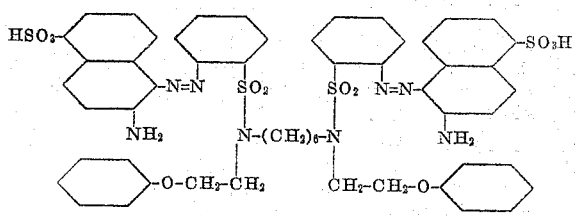

33.3 parts of bis-(o-aminobenzene sulphonyl)-N.N'-bis-phenoxyethyl-1.6-diaminohexane (M. P. 142°) are suspended in 100 parts of glacial acetic acid and dissolved by the dropwise addition while stirring at 10–15° of 7 parts of concentrated sulphuric acid. The solution of 7 parts of sodium nitrite in 20 parts of water is then added dropwise while externally cooling at 0–10° and then the solution is slowly diluted with 300 parts of ice water. The yellow solution of the tetrazo compound so obtained is then stirred at 0 to 10° into the solution of the sodium salt of 22.3 parts of 2-aminonaphthalene-5-sulphonic acid and 28 parts of crystallised sodium acetate in 500 parts of water whereupon the colour turns orange and some of the disazo dyestuff formed precipitates. After an hour, the mixture is heated to 70°, neutralized with sodium carbonate and the dyestuff is precipitated by the gradual addition of 100 parts of sodium chloride. The dyestuff in the form of an orange-brown powder is filtered off under suction and dried. It dyes wool from a dyebath containing ammonium sulphate or acetic acid in pure orange shades. The wool dyeings have very good wet and light fastness properties.

EXAMPLE 5

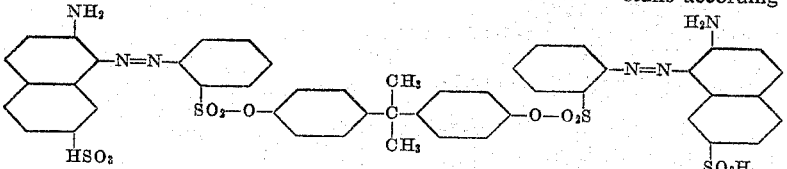 

53.8 parts of 2.2-bis-[4'-(2''-aminobenzene sulphonyloxy)-phenyl]-propane (M. P. 158–159°) are dissolved in 150 parts of glacial acetic acid, 30 parts of concentrated sulphuric acid are carefully added while cooling and it is tetrazotised at 5–10° by the dropwise addition of the solution of 13.8 parts of sodium nitrite in 35 parts of water. 300 parts of ice are added in portions to the colourless solution whereupon it is poured slowly into the cold solution of the sodium salt of 44.6 parts of 2-aminonaphthalene-7-sulphonic acid in 450 parts of water. The mineral acid reaction is buffered until Congo red paper is no longer coloured blue by the dropwise addition of 60 parts of sodium acetate in 300 parts of water within one hour. The orange suspension is then stirred for one hour at 10–20°, then heated to 60° and neutralised by the addition of sodium carbonate. The precipitated disazo dyestuff is filtered off under suction and dried.

It is an orange powder which dissolves in hot water with an orange colour and dyes wool from a neutral to weakly acid bath in pure orange shades. The wool dyeings have very good milling, sea water and light fastness properties.

A similar dyestuff is obtained if in the above example, the 2-aminonaphthalene-7-sulphonic acid is replaced by the same number of parts of 2-aminonaphthalene-6-sulphonic acid.

Dyestuffs with similar properties are obtained if in the above example 55.2 parts of 2.2-bis-[4'-(2''-aminobenzene is sulphonyloxy)-phenyl]-butane or 59.4 parts of 3.3-bis-[4'-(2''-aminobenzene sulphonyloxy)-phenyl]-5-methylhexane are used as tetrazo components and otherwise the same procedure is followed. These tetrazo components are obtained by reacting methylethyl ketone or 2-methyl-hexanone-4 with excess phenol and esterifying the methyl alcoholic solution of the alkali salts of the condensation products obtained with 2 mols of 2-nitrobenzene sulphonic acid chloride and reducing the nitro groups to amino groups.

EXAMPLE 6

100 parts of wool which have been previously well wetted are entered at 50° into a dyebath containing 3000 parts of water, 2 parts of the disazo dyestuff obtained according to Example 5, 10 parts of Glauber's salt and 4 parts of ammonium sulphate. The bath is brought to the boil within 15 minutes and boiled for 45 minutes. The bath is completely exhausted and a very pure orange wool dyeing is obtained which is distinguished by good wet fastness and very good light fastness properties.

The disazo dyestuffs obtained according to the other examples can be dyed onto wool in a similar manner. Possibly 1 to 2% of acetic acid can be added to the liquor towards the end of the dyeing so that the disazo dyestuffs according to the present invention which draw less well from a neutral bath can be completely extracted from the bath.

The following table contains further examples of disazo dyestuffs according to the present invention which are produced by processes similar to those described in Examples 1 to 5.

*Table*

| No. | Tetrazo component diacyl derivative of bridging member | | Coupling component | Shade on wool |
|---|---|---|---|---|
| 1 | o-aminobenzene-sulphonyl- | N.N' - bis - phenoxyethyl - ethylene diamine. | 2-amino-8-hydroxy-naphthalene-6-sulphonic acid. | red. |
| 2 | ___do___ | Bis-N-benzylamino-ethyl sulphide. | ___do___ | Do. |
| 3 | ___do___ | Bis-N-benzylamino-ethyl ether. | ___do___ | Do. |
| 4 | ___do___ | 4.4' - bis - ethylamino - 3.3' - dimethyldiphenyl. | ___do___ | Do. |
| 5 | ___do___ | 4.4' - bis - ethylamino - 2.2' - dimethyldiphenyl. | ___do___ | Do. |
| 6 | ___do___ | ___do___ | 2-aminonaphthalene-5-sulphonic acid. | orange. |

Table—Continued

| No. | Tetrazo component diacyl derivative of bridging member | | Coupling component | Shade on wool |
|---|---|---|---|---|
| 7 | o-aminobenzene-sulphonyl-. | 4.4' - bis - ethylamino - 2.2' - dimethyldiphenyl. | 2 - ethylaminonaphthalene - 6 - sulphonic acid. | yellow red. |
| 8 | ___do___ | 1.1 - bis - (4' - ethylamino - phenyl)-cyclohexane. | 2-aminonaphthalene-5-sulphonic acid. | orange. |
| 9 | ___do___ | 2.2-bis-(4'-n-butyl-amino-phenyl)-propane. | ___do___ | Do. |
| 10 | ___do___ | 4.4' - bis - ethylamino - di - phenyl sulphide. | 2 - amino - 8 - hydroxy - naphthalene-6-sulphonic acid. | red. |
| 11 | ___do___ | 1.4-dihydroxybenzene | 2 - aminonaphthalene - 7 - sulphonic acid. | orange. |
| 12 | ___do___ | 3.3-bis-(4'-hydroxyphenyl)-heptane. | ___do___ | Do. |
| 13 | 4-methyl-2-amino-benzene sulphonyl-. | 2.2-bis-(4'-hydroxyphenyl)-propane. | 2-amino-8-hydroxynaphthalene-6-sulphonic acid. | red. |
| 14 | 4-methoxy-2-aminobenzene sulphonyl-. | ___do___ | ___do___ | Do. |
| 15 | 5-acetamino-2-aminobenzene sulphonyl-. | ___do___ | 2 - aminonaphthalene - 7 - sulphonic acid. | orange. |
| 16 | ___do___ | 1.1-bis-(4'-hydroxyphenyl)-cyclohexane. | 2 - amino - 8 - hydroxynaphthalene-6-sulphonic acid. | red. |
| 17 | 2-aminobenzene sulphonyl-. | 2.2-bis-(4'-hydroxyphenyl)-n-butane. | ___do___ | Do. |
| 18 | ___do___ | 4-hydroxy-1-benzylaminobenzene. | 2 - aminonaphthalene - 5 - sulphonic acid. | orange. |
| 19 | ___do___ | ___do___ | 2 - aminonaphthalene - 7 - sulphonic acid. | Do. |
| 20 | ___do___ | 2.2' - dihydroxy - 5.5' - dimethyldiphenyl-methane. | ___do___ | Do. |
| 21 | ___do___ | 2.2-bis-(4'-hydroxyphenyl)-propane. | 2-amino-5-methoxynaphthalene-7-sulphonic acid. | Do. |
| 22 | ___do___ | 4.4'-bis-ethylaminodiphenyl methane. | 2-amino-5-ethoxynaphthalene-7-sulphonic acid. | Do. |
| 23 | ___do___ | 4.4' - dihydroxydiphenyl sulphone. | 2-aminonaphthalene-5-sulphonic acid. | Do. |
| 24 | ___do___ | 2.2 - bis - (3' - methyl - 4' - hydroxyphenyl)-propane. | 2 - amino - 8 - hydroxynaphthalene-6-sulphonic acid. | red. |
| 25 | ___do___ | 1.1-bis-(4'-hydroxyphenyl)-1-phenylethane. | ___do___ | Do. |
| 26 | 5-chloro-2-aminobenzene sulphonyl-. | 4.4' - bis - ethylamino - diphenyl methane. | 2 - ethylamino - naphthalene - 7 - sulphonic acid. | Do. |
| 27 | ___do___ | ___do___ | 2-amino-8-hydroxynaphthalene-6-sulphonic acid. | blue-red. |
| 28 | 2-aminobenzene sulphonyl-. | 1.1-bis-(4'-hydroxyphenyl)-cyclohexane. | 1 mol 2-aminonaphthalene-3.6-disulphonic acid. ⎱ 1 mol 2-aminonaphthalene-5-sulphonic acid. ⎰ | orange. |
| 29 | ___do___ | 1.6 - bis - phenoxy - ethyl - amino-n-hexane. | 1 mol 2-amino-naphthalene-3.6-disulphonic acid. ⎱ 1 mol 2-amino-naphthalene-7-sulphonic acid. ⎰ | Do. |
| 30 | ___do___ | 2.2-bis-(4'-hydroxyphenyl)-propane. | 2-aminonaphthalene-5-sulphonic acid. | Do. |
| 31 | 5-chloro-2-aminobenzene sulphonyl-. | 2.2' - dihydroxy - 5.5' - dimethyl-diphenyl methane. | ___do___ | Do. |
| 32 | ___do___ | ___do___ | 2 - aminonaphthalene - 7 - sulphonic acid. | Do. |
| 33 | 2-aminobenzene sulphonyl-. | 4.4'-bis-ethylamino-dicyclohexyl methane. | 2 - aminonaphthalene - 5 - sulphonic acid. | Do. |
| 34 | ___do___ | ___do___ | 2-amino-8-hydroxynaphthalene-6-sulphonic acid. | red. |
| 35 | 4-methyl-2-aminobenzene sulphonyl-. | 2.2-bis-(4'-hydroxyphenyl)-propane. | 2 - aminonaphthalene - 5 - sulphonic acid. | orange. |
| 36 | 4-methoxy-2-aminobenzene sulphonyl-. | ___do___ | 2 - aminonaphthalene - 7 - sulphonic acid. | Do. |
| 37 | o-aminobenzene-sulphonyl-. | ___do___ | 2 - ethylamino - naphthalene - 7 - sulphonic acid. | yellow-red. |
| 38 | ___do___ | 2.2-bis-(4'-hydroxyphenyl)-butane. | 2-methylamino-naphthalene-7-sulphonic acid. | Do. |
| 39 | ___do___ | 1.4-dihydroxybenzene | 2 - aminonaphthalene - 5 - sulphonic acid. | orange. |
| 40 | ___do___ | 4.4'-dihydroxydiphenyl sulphone. | 2 - ethylamino - naphthalene - 7 - sulphonic acid. | yellow-red. |
| 41 | 4-methyl-2-aminobenzene sulphonyl-. | 4.4' - bis - ethylamino - 3.3' - dimethyldiphenyl. | 2-amino-8-hydroxynaphthalene-6-sulphonic acid. | red. |
| 42 | ___do___ | ___do___ | 2 - aminonaphthalene - 5 - sulphonic acid. | orange. |
| 43 | ___do___ | ___do___ | 2 - aminonaphthalene - 7 - sulphonic acid. | Do. |
| 44 | 4-methoxy-2-aminobenzene sulphonyl-. | ___do___ | 2-amino-8-hydroxynaphthalene-6-sulphonic acid. | red. |
| 45 | ___do___ | ___do___ | 2 - aminonaphthalene - 5 - sulphonic acid. | orange. |
| 46 | ___do___ | ___do___ | 2 - aminonaphthalene - 7 - sulphonic acid. | Do. |
| 47 | 5-acetamino-2-aminobenzene sulphonyl-. | ___do___ | 2-amino-8-hydroxynaphthalene-6-sulphonic acid. | red. |
| 48 | ___do___ | ___do___ | 2 - aminonaphthalene - 7 - sulphonic acid. | orange. |
| 49 | o-aminobenzene sulphonyl-. | 4.4' - bis - ethylamino - diphenyl methane. | 2 - butylamino - naphthalene - 7 - sulphonic acid. | yellow-red. |

What we claim is:
1. A disazo dyestuff of the general formula:

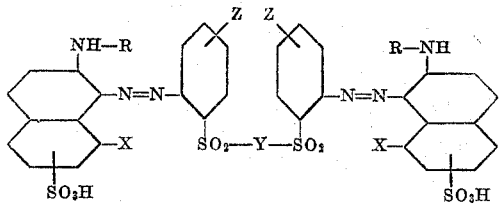

wherein R represents a member selected from the group consisting of H and lower alkyl radicals, X represents a member selected from the group consisting of H and a hydroxy group, Y represents a member selected from the group consisting of a diphenol and a disecondary diamine radical bound to the $SO_2$-groups by means of the hydroxy oxygen and the aminonitrogen atoms respectively, and Z represents a member selected from the group consisting of H, $CH_3$, $OCH_3$, Cl and $NHCOCH_3$.

2. A disazo dyestuff of the general formula:

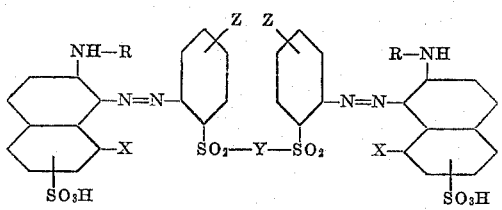

wherein R represents a member selected from the group consisting of H and lower alkyl radicals, X represents a member selected from the group consisting of H and a hydroxy group, Y represents a diphenol radical bound to the $SO_2$-groups by means of its hydroxy oxygen atoms, and Z represents a member selected from the group consisting of H, $CH_3$, $OCH_3$, Cl and $NHCOCH_3$.

3. A disazo dyestuff of the general formula:

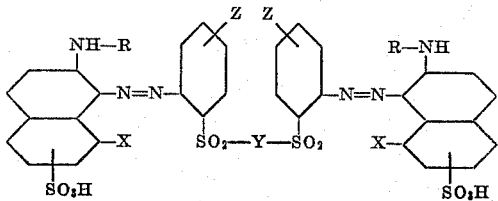

wherein R represents a member selected from the group consisting of H and lower alkyl radicals, X represents a member selected from the group of H and a hydroxy group, Y represents a disecondary diamine radical bound to the $SO_2$-groups by means of its aminonitrogen atoms, and Z represents a member selected from the group consisting of H, $CH_3$, $OCH_3$, Cl and $NHCOCH_3$.

4. A disazo dyestuff of the formula:

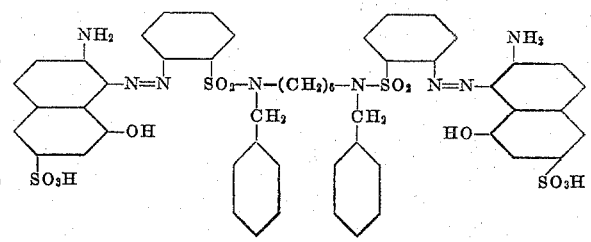

wherein X represents a member selected from the group consisting of H and OH, Y represents a diphenol radical bound to the —$SO_2$— groups by means of its hydroxy oxygen atoms, and Z represents a member selected from the group consisting of H, $CH_3$, $OCH_3$ and Cl.

5. A disazo dyestuff of the formula:

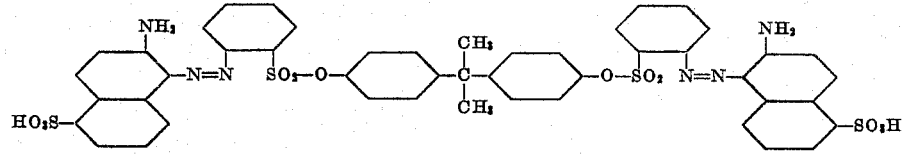

6. A disazo dyestuff of the formula:

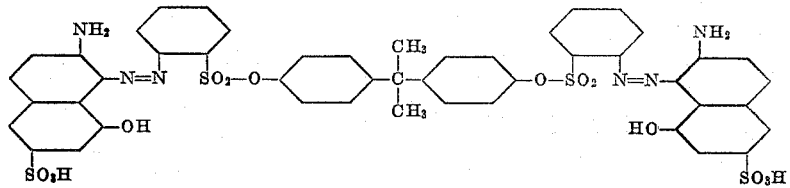

7. A disazo dyestuff of the formula:

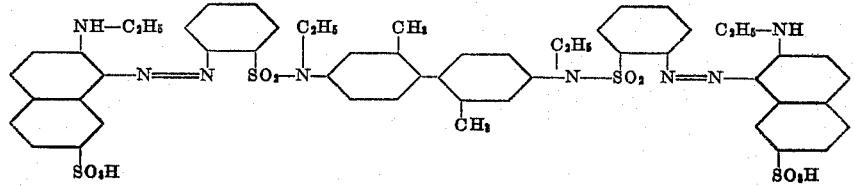

8. A disazo dyestuff of the formula:

9. A disazo dyestuff of the formula:
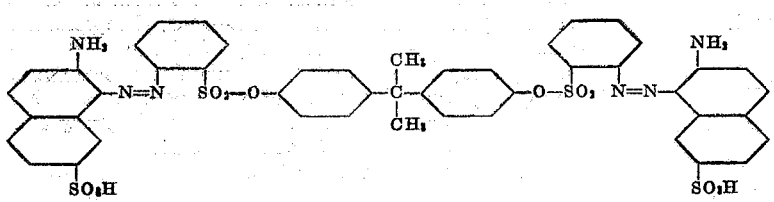
No references cited.